(No Model.)

J. M. YOUNG.
WHEEL PLOW.

No. 339,037. Patented Mar. 30, 1886.

Witnesses
Susie R. Seiler
R. W. Bishop

Inventor
Joseph M. Young
By his Attorneys,
R. S. & A. P. Lacey

UNITED STATES PATENT OFFICE.

JOSEPH M. YOUNG, OF BEAN'S STATION, TENNESSEE.

WHEEL-PLOW.

SPECIFICATION forming part of Letters Patent No. 339,037, dated March 30, 1886.

Application filed January 22, 1886. Serial No. 189,409. (No model.)

*To all whom it may concern:*

Be it known that I, JOSEPH M. YOUNG, a citizen of the United States, residing at Bean's Station, in the county of Grainger and State of Tennessee, have invented certain new and useful Improvements in Wheel-Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of agricultural implements commonly termed "sulky-plows;" and it consists in novel features of construction, more particularly hereinafter set forth and claimed.

Figure 1:
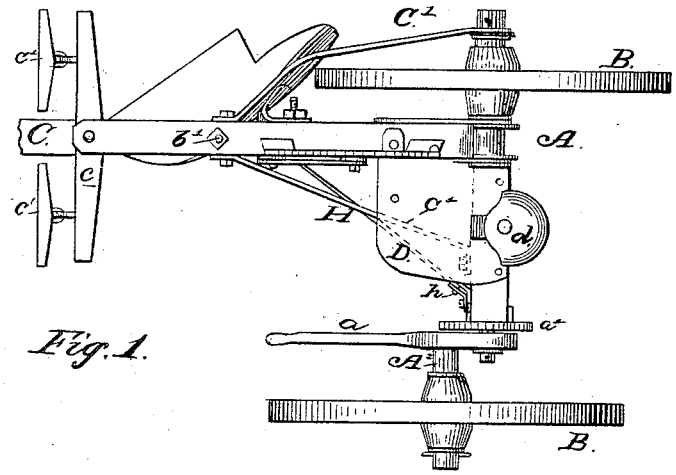
Figure 2:
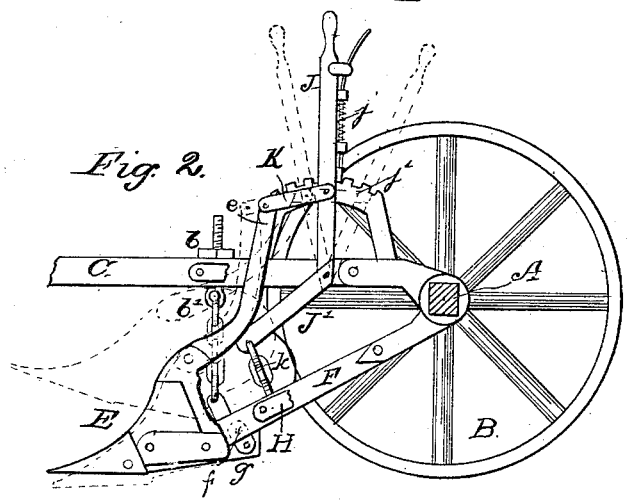
Figure 3:
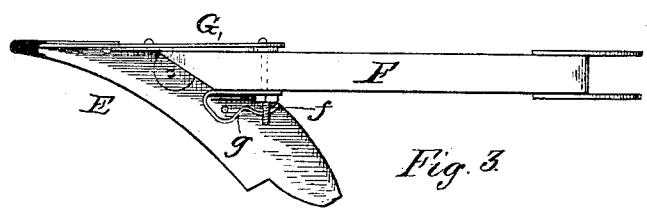

In the accompanying drawings, Figure 1 is a plan view of an implement constructed in accordance with the spirit of my invention. Fig. 2 is a side elevation, with parts broken away to show the details of construction. Fig. 3 is a bottom plan view of the plow and its support on an enlarged scale and detached.

The axle A is provided at one end with the usual crank-axle arm, A', and the actuating-lever $a$ and segment $a'$, for the purpose of leveling the plow. The opposite ends of the axle have supporting-wheels B. A tongue, C, is rigidly secured at its inner end to the axle, and brace-rods C' prevent any lateral movement of the tongue independent of the axle. The tongue may be provided with a double and single trees, $c$ $c'$, respectively. Projecting from and secured to the axle is a platform, D, recessed near its rear edge to permit the passage of the spring support of the seat $d$.

The plow E is of ordinary construction, and an arm, $e$, projecting upward from its front portion, has a slight rearward curve near its junction with the plow to throw the upper portion nearer the axle. A support, F, is hinged at one end to the axle, preferably in the plane of the tongue, so that it may come directly beneath the tongue. The other end of the support is pivotally connected to the lower rear corner of the plow by a bolt, $f$, passing through it, the landside G, and a bracket, $g$, secured to the mold-board. A brace, H, is pivoted at one end to the support and at its other end to a bracket, $h$, near the outer end of the axle, and is arranged to move with the support in its motion about the axle. The downward movement of the outer end of the support is limited and regulated by a bolt, $b$, passing vertically through the tongue, and a connection, $b'$, joining the ends of the bolt and support. A lever, J, having a forward-projecting arm, J', is pivoted to the rear portion of the tongue, and its locking-latch $j$ is adapted to engage a segment, $j'$, to hold it in any desired position. A flexible connection, $k$, unites the end of the arm J' with the forward portion of the support F, whereby the plow may be raised or lowered, as will presently appear. A link, K, connects the upper end of the arm $e$ with the lever J above its pivotal point.

It will be observed that the plow being pivoted at its heel to the support F, and the latter being at its lowest point, a tilting of the plow on its pivotal connection with the support will elevate or depress the point, as indicated by the dotted lines, Fig. 2. This tilting motion is accomplished by means of the lever J through the link K and arm $e$, as will be readily appreciated. These parts are so proportioned that within a certain throw of the lever the pitch or inclination of the plow will be regulated. When the lever is thrown back beyond this limit, as indicated by the dotted lines to the right in Fig. 2, the support is elevated and the plow elevated from the ground. In this operation it will be noticed that the arm $e$ and link K are so disposed that as the lever draws upward on the support and elevates the rear of the plow the front is simultaneously elevated, so that the plow remains parallel, or nearly so, to its normal position.

By raising or lowering the bolt $b$ the height of the plow from the ground may be regulated.

Having thus described my invention, what I claim, and desire to secure by Letters Patent, is—

1. In a wheel-plow, the combination of the axle, a support hinged thereto, a tongue, the plow pivoted at its heel to the outer end of the support, an adjustable connection interposed between the support and tongue, the lever for adjusting the support, and a connection uniting the lever with the front end of the plow to regulate the pitch of the point, as and for the purposes specified.

2. The combination of the axle, a tongue projected therefrom, the support hinged at its inner end to the axle, the plow pivoted at its heel to the outer end of the support and having an arm projected upward from its front portion, an adjustable connection interposed between the support and the tongue, a lever having a forwardly-projecting arm connected with the support, and a connection uniting the arm of the plow with the lever, all constructed and operating in the manner hereinbefore set forth.

In testimony whereof I affix my signature in presence of two witnesses.

JOSEPH M. YOUNG.

Witnesses:
L. J. JONES,
J. C. CLARK.